United States Patent
Wang et al.

(10) Patent No.: US 12,411,831 B2
(45) Date of Patent: Sep. 9, 2025

(54) DATABASE INDEX PERFORMANCE IMPROVEMENT

(71) Applicant: International Business Machines Corporation, Armonk, NY (US)

(72) Inventors: Xiaobo Wang, Beijing (CN); Shuo Li, Beijing (CN); Sheng Yan Sun, Beijing (CN); Xiao Hui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 17/645,214

(22) Filed: Dec. 20, 2021

(65) Prior Publication Data

US 2023/0195710 A1 Jun. 22, 2023

(51) Int. Cl.
*G06F 16/00* (2019.01)
*G06F 16/215* (2019.01)
(Continued)

(52) U.S. Cl.
CPC ........ *G06F 16/2272* (2019.01); *G06F 16/215* (2019.01); *G06F 16/2365* (2019.01)

(58) Field of Classification Search
CPC ...... G06F 16/184; G06F 16/214; G06F 3/061; G06F 3/067; G06F 16/113; G06F 11/14; G06F 3/064; G06F 11/00; G06F 16/211; G06F 16/22; G06F 16/2246; G06F 16/2272; G06F 16/2365; G06F 16/2379; G06F 16/24542; G06F 12/0215; G06F 12/0246;
(Continued)

(56) References Cited

U.S. PATENT DOCUMENTS 5,204,958 A * 4/1993 Cheng ................. G06F 16/9027
707/999.102
10,095,721 B2 10/2018 Chen et al.
(Continued)

FOREIGN PATENT DOCUMENTS

CN 105335482 A 2/2016
WO 2023/116347 A1 6/2023

OTHER PUBLICATIONS

Anonymous, "A Method to Improve Performance for Index Operation," Dec. 31, 2020, An IP.com Prior Art Database Technical Disclosure, IPCOM000264515D, 5 pages.
(Continued)

*Primary Examiner* — Shyue Jiunn Hwa
(74) *Attorney, Agent, or Firm* — Yee & Associates, P.C.

(57) ABSTRACT

Managing database operations is provided. The method comprises receiving an insert statement for a database and determining if the insert statement is for a batch insert operation or random insert operation. For a batch insert operation, responsive to determining a threshold number of specified leaf pages are missing from a memory buffer pool of the database, the database asynchronously pre-loads missing leaf pages from a corresponding index on disk into the memory buffer pool. For a random insert operation, responsive to determining a threshold number of specified leaf pages are missing from a memory buffer pool of the database, the database builds at least one memory cache index and inserts key values specified in the insert statement in the memory cache index. The memory cache index is merged with a corresponding index on disk.

20 Claims, 16 Drawing Sheets

(51) Int. Cl.
*G06F 16/22* (2019.01)
*G06F 16/23* (2019.01)

(58) Field of Classification Search
CPC .. G06F 12/0638; G06F 12/0866; G06F 12/12; G06F 16/9027; G06F 2212/205; G06F 2212/654; G06F 2212/7203; G06F 3/0613; G06F 3/065; G06F 3/0659; G06F 3/0679; G06F 11/2094; G06F 11/2097; G06F 16/2343; G06F 16/27; G06F 16/29; G06F 16/215; G06F 16/2264; G06F 16/2336; G06F 16/2358; G06F 16/2433; G06F 16/9538; G06F 16/9577
See application file for complete search history.

(56) References Cited

U.S. PATENT DOCUMENTS

| | | | |
|---|---|---|---|
| 10,592,149 B1* | 3/2020 | Jenkins | G06F 16/1752 |
| 11,797,510 B2* | 10/2023 | Subramanian Seshadri | G06F 16/1748 |
| 2006/0182030 A1* | 8/2006 | Harris | H04W 52/04 370/230 |
| 2015/0347470 A1 | 12/2015 | Ma et al. | |
| 2016/0092503 A1 | 3/2016 | Deshmukh et al. | |
| 2019/0205244 A1* | 7/2019 | Smith | G06F 3/065 |
| 2020/0065314 A1 | 2/2020 | Phillips | |

OTHER PUBLICATIONS

Anonymous, "Fast and resource efficient table index maintenance following mass table record deletes," Apr. 13, 2011, An IP.com Prior Art Database Technical Disclosure, IPCOM000206068D, 4 pages.
Sadoghi et al., "Making Updates Disk-I/O Friendly Using SSDs," Proceedings of the VLDB Endowment, Aug. 2013, 13 pages. https://www.researchgate.net/publication/262394013.
"Prefetching data into the buffer pool," IBM Documentation, IBM Corporation, copyright 2014, accessed Jun. 2, 2021, 4 pages. https://www.ibm.com/docs/en/db2/11.1?topic=management-prefetching-data-into-buffer-pool.
PCT International Search Report and Written Opinion, dated Feb. 28, 2023, regarding Application No. PCT/CN2022/134539, 7 pages.

* cited by examiner

DATABASE INDEX PERFORMANCE IMPROVEMENT

BACKGROUND

1. Field

The disclosure relates generally to computing systems and more specifically to improving database system performance.

2. Description of the Related Art

Relational databases store and provide access to data in relation to other data. For example, a relational database may allow access to customer data in relation to product orders or vice versa. This data is organized in tables comprising columns and rows which are stored in a number of pages on a disk in the database. In order to delete or update data stored on disk, the pages containing that data must first be loaded into a cache buffer where the operations can be applied to the pages. After the operations are applied to the pages in question, the modified pages are written back to disk.

SUMMARY

An illustrative embodiment provides a computer-implemented method for managing database operations. The method comprises using a number of processors to perform the steps of receiving an insert statement for a database and determining if the insert statement is for a batch insert operation or random insert operation. For a batch insert operation, responsive to determining a threshold number of leaf pages specified in the insert statement are missing from a memory buffer pool of the database, the database asynchronously pre-loads missing leaf pages from a corresponding index on disk in the database into the memory buffer pool. For a random insert operation, responsive to determining a threshold number of leaf pages specified in the insert statement are missing from a memory buffer pool of the database, the database builds at least one memory cache index and inserts key values specified in the insert statement in the memory cache index. The memory cache index is merged with a corresponding index on disk in the database.

According to other illustrative embodiments, a computer system and a computer program product for managing database operations are provided.

DETAILED DESCRIPTION

Figure 1:
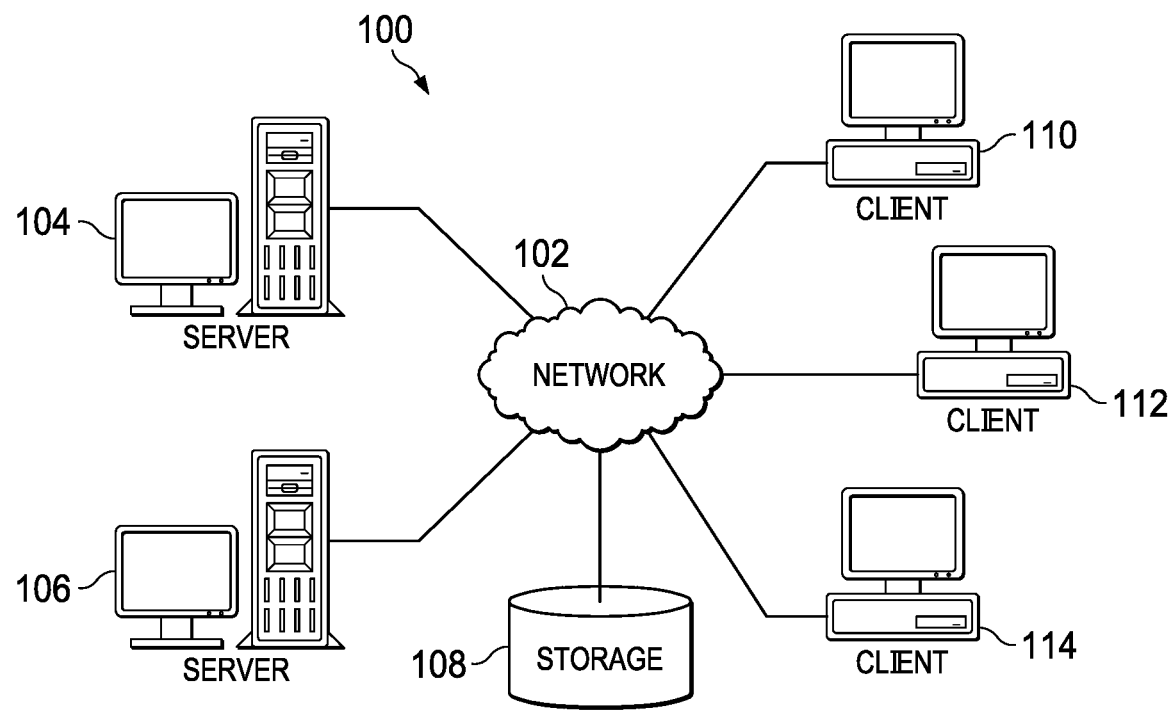
FIG. 1 depicts a pictorial representation of a network of data processing systems in which illustrative embodiments can be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. The illustrative embodiments recognize and take into account that in order to delete or update data stored on disk, the pages containing that data must first be loaded into a cache buffer where the operations can be applied to the pages. After the operations are applied to the pages in question, the modified pages are written back to disk.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only.

In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, smart tags, IoT sensors, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage 108 may store other types of data, such as authentication or credential data that may include usernames, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer-readable storage medium and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
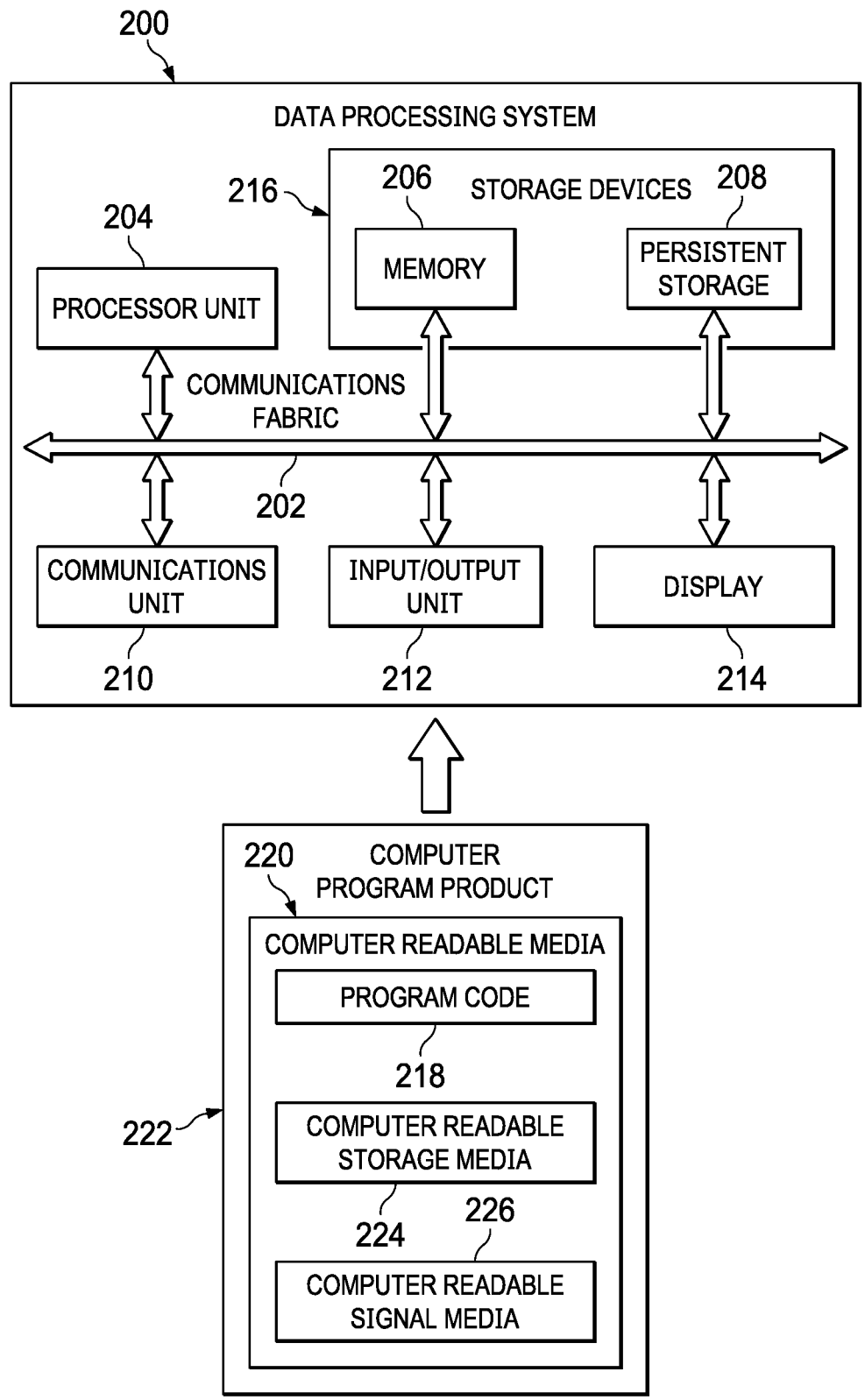
FIG. 2 is a diagram of a data processing system is depicted in accordance with an illustrative embodiment

With reference now to FIG. 2, a diagram of a data processing system is depicted in accordance with an illustrative embodiment. Data processing system 200 is an example of a computer, such as server 104 in FIG. 1, in which the illustrative embodiments may be implemented. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208.

These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 218 is located in a functional form on computer-readable media 220 that is selectively removable and may be loaded onto or transferred to data processing system 200 for running by processor unit 204. Program code 218 and computer-readable media 220 form computer program product 222. In one example, computer-readable media 220 may be computer-readable storage media 224 or computer-readable signal media 226.

In these illustrative examples, computer-readable storage media 224 is a physical or tangible storage device used to store program code 218 rather than a medium that propagates or transmits program code 218. Computer-readable storage media 224 may include, for example, an optical or magnetic disc that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory that is connected to data processing system 200.

Alternatively, program code 218 may be transferred to data processing system 200 using computer-readable signal media 226. Computer-readable signal media 226 may be, for example, a propagated data signal containing program code 218. For example, computer-readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 220" can be singular or plural. For example, program code 218 can be located in computer-readable media 220 in the form of a single storage device or system. In another example, program code 218 can be located in computer-readable media 220 that is distributed in multiple data processing systems. In other words, some instructions in program code 218 can be located in one data processing system while other instructions in program code 218 can be located in one or more other data processing systems. For example, a portion of program code 218 can be located in computer-readable media 220 in a server computer while another portion of program code 218 can be located in computer-readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

The illustrative embodiments recognize and take into account that for a Structured Query Language (SQL) Insert operation, when a new row is inserted into a base table, all related indexes defined on that base table will correspondingly be modified. However, if the index leaf pages being modified are not already in the buffer pool, system performance will be poor due to synchronous read input/output (I/O) to load those pages into the database buffer pool and then perform the relevant modifications against these leaf pages.

The illustrative embodiments recognize and take into account that simply trying to increase the size of the buffer pool or adjusting buffer parameters to improve the page hit ratio has several drawbacks. For one, it is impossible to make the buffer pool size as large as the disk. Furthermore, for pages referenced less times in the buffer pool, performance improvement is quite limited.

The illustrative embodiments also recognize and take into account that dropping the index before a large Insert operation has the drawback of requiring a long time to rebuild the index. In addition, some SQLs cannot execute until the index is available.

The illustrative embodiments provide a method to improve database system performance on Insert, Delete, and Update operations by building a memory cache index to avoid synchronous in page I/O. Insert operations can be performed as batch Inserts or random Insert. For batch Insert, a pre-loading mechanism pre-loads index leaf pages when the buffer pool hit ratio against leaf pages decreases significantly.

For random Insert, the memory cache index is used if leaf pages where the new key value will insert are missed hit in the buffer pool. Multiple memory cache indexes are dynamically merged into one index before consolidation with the existing corresponding index on disk, thereby reducing I/O and improving query performance. The merge may be performed at the page level or range level.

Figure 3:
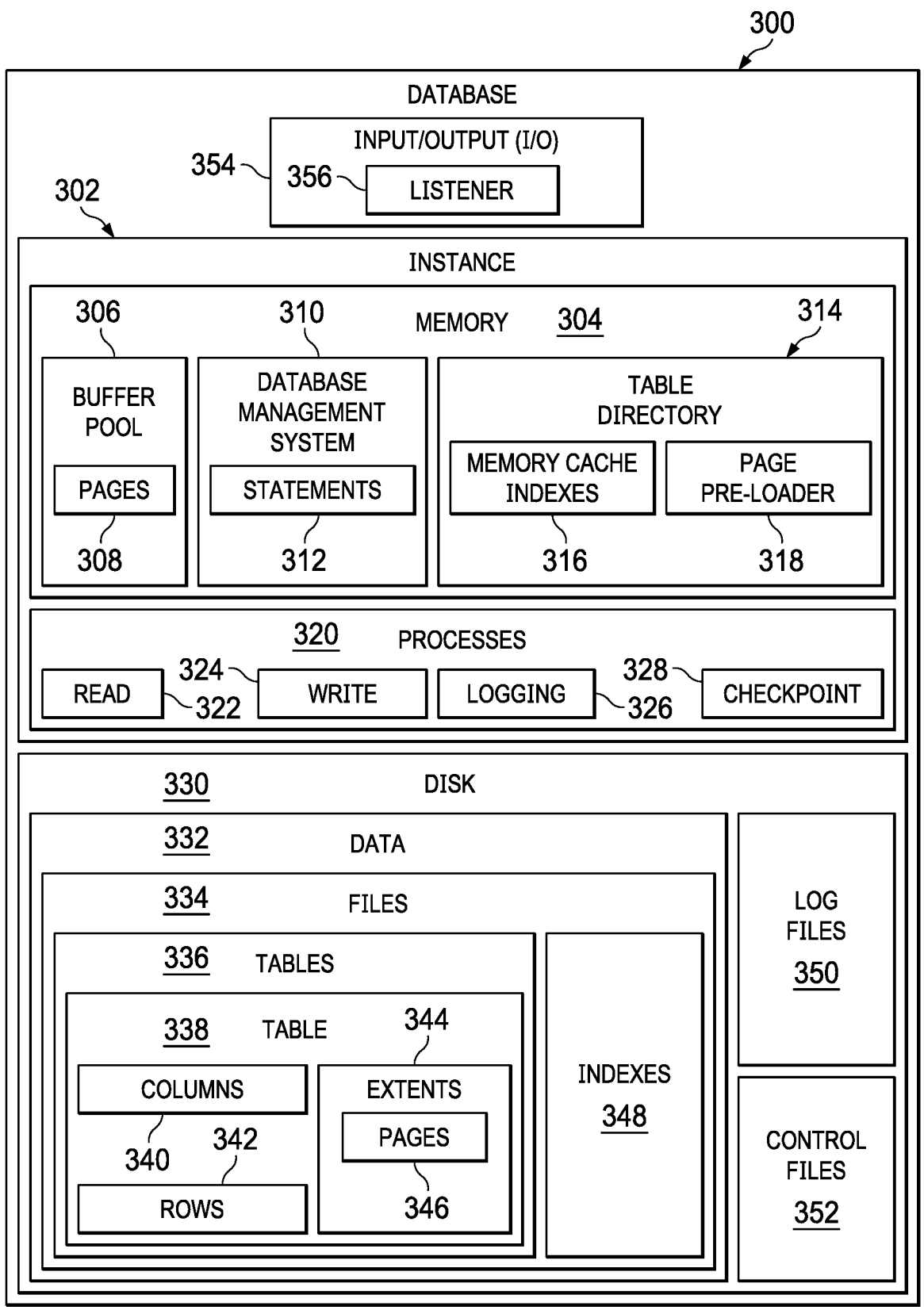
FIG. 3 depicts a block diagram illustrating a database in accordance with an illustrative embodiment.

FIG. 3 depicts a block diagram illustrating a database in accordance with an illustrative embodiment. Database 300 might be an example of storage 108 in FIG. 1 and may be implemented in data processing system 200 in FIG. 2. Database 300 comprises instance 302 and disk 330. Instance 302 comprises a set of memory structures that manage database files stored on disk 330.

Instance 302 comprises memory 304 and processes 320. Memory 304 includes buffer pool 306, which stores pages 308 that have been read from disk 330. Database management system 310 comprises software used to manage, retrieve, and manipulate data 332 in the database 300 and makes it possible for end uses to create, read, update, and delete data. Database management system 310 serves as an interface between the database 300 and end users or application programs.

Data management statements 312 received from a client system, e.g., client 110 in FIG. 1, via listener 356 in input/output (I/O) 354 provide instructions to database 300 regarding transactions performed on the data 332 stored on disk 330. Examples of data management statements 312 include Insert, Delete, and Update. Data management statements 312 might comprises respective ranges of data entries in files 334 to which the transaction applies.

Disk 330 comprises data 332, which is organized in a number of files 334. Files 334 in turn comprise a number of tables 336. Each table 338 comprises a number of columns 340 and rows 342. The actual data rows 342 are stored on a number of pages 346. Pages 346 constitute the smallest level of I/O and are grouped into extents 344, typically in groups of eight pages. Files 334 also comprise indexes 348 that are related to specific tables and comprise one or more keys that allow a database query to efficiently retrieve data 332 from disk 330. Disk 330 also comprises log files 350 that contain transactions which have not yet been committed to the database and control files 352 that keep track of the database's status and physical structure.

The operations comprising a transaction are not performed directly on data 332 on disk 330. Rather, pages 308 of data are first read into buffer pool 306 from disk 330 before the operations in data management statements 312 can be applied. Processes 320 comprise reading 322 and writing 324 data to and from disk 330. Logging 326 records transaction information regarding transaction operations applied to any pages 308 in the buffer pool 306. Checkpoint 328 writes modified ("dirty") pages from buffer pool 306 to disk 330 and records transaction information in log files 350.

Table directory 314 contains metadata for the data 332 in database 300. Table directory 314 comprises a list of all files 334 in database 300, the number of records in each file, and the names and types of each data field.

Table directory 314 includes memory cache indexes 316 for pages where new key values will insert that are missed in the buffer pool 306. Table directory 314 also includes a page pre-loader 318 that pre-loads leaf pages from disk 330 into buffer pool 306 for batch Insert operations.

Figure 4:
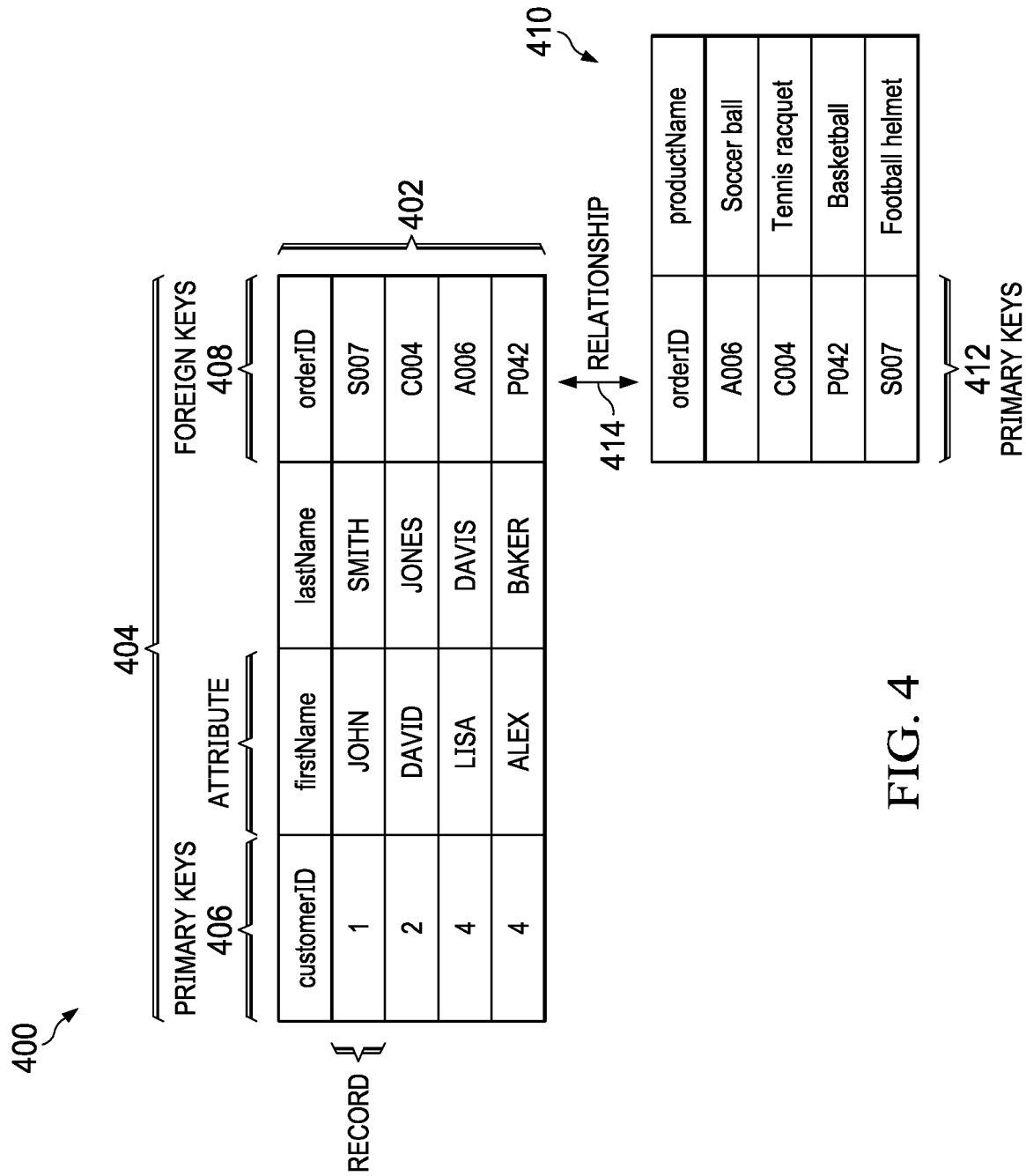
FIG. 4 depicts a diagram illustrating a relational database table with which the illustrative embodiments can be implemented.

FIG. 4 depicts a diagram illustrating a relational database table with which the illustrative embodiments can be implemented. Table 400 comprises a number of rows 402 and columns 404. The columns 404 are called attributes and denote the type of data in the table. The rows 402 are called records or tuples and represent instances of the types of data denoted by the columns 404.

Each row is identified by a primary key in primary keys 406. Rows in a table can be linked to rows in other tables by adding the primary keys of the linked rows in a column of the other tables. Such keys in other tables that refer to the primary keys of linked rows are known as foreign keys. In the present example, the primary keys 412 in table 410 are listed as foreign keys 408 in table 400, thereby establishing relationship 414 between the customer table and the product order table.

In practice, database tables are likely to be vastly larger than the simple example depicted in FIG. 4. In such cases, a range operation might span across many pages within a database.

Figure 5:
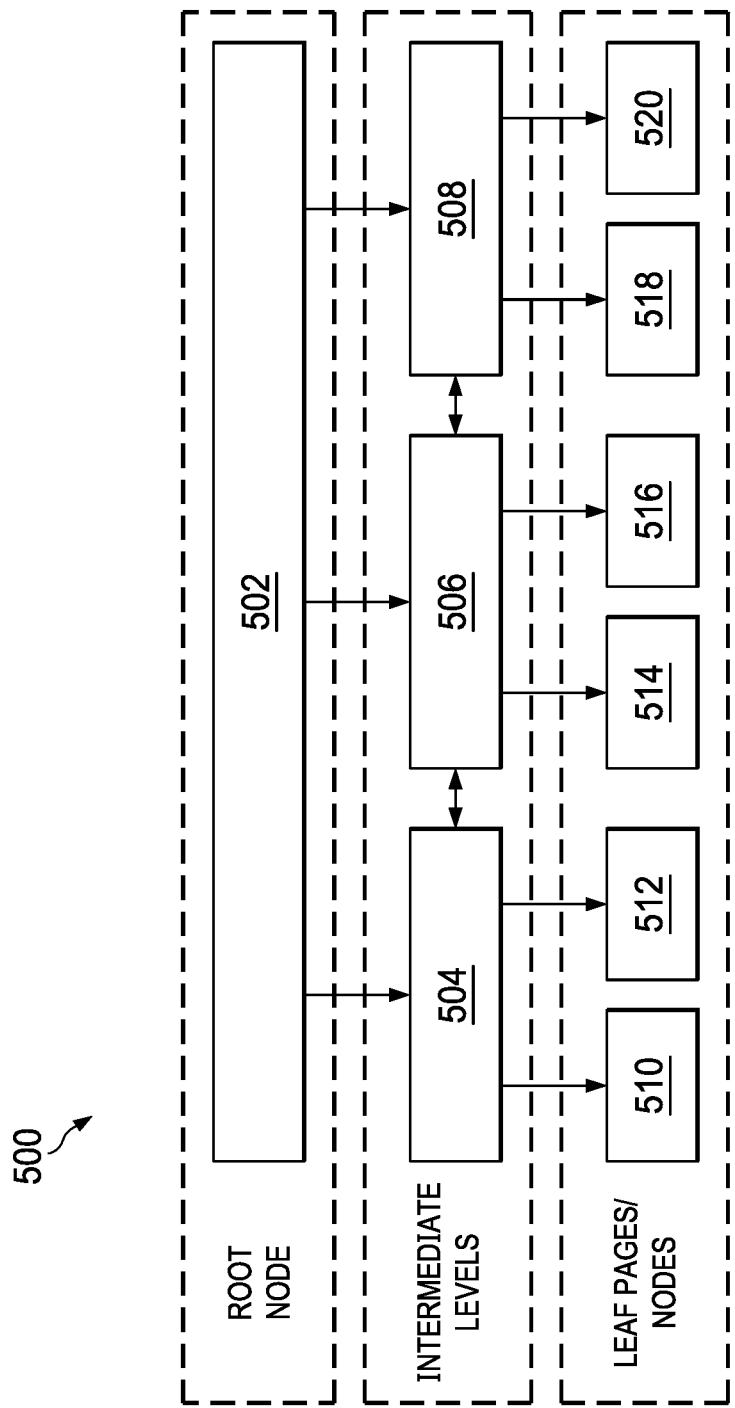
FIG. 5 depicts a tree diagram illustrating an index structure with which the illustrative embodiments may be implemented.

FIG. 5 depicts a tree diagram illustrating an index structure with which the illustrative embodiments may be implemented. In the present example index structure (or B-Tree) 500 is organized into several levels comprising a root node 502, intermediate levels including nodes 504, 506, 508, and leaf pages/nodes 510, 512, 514, 516, 518, 520. Index structure 500 is an example of how data in a table (e.g., table 400) is stored in a database.

Index structure 500 is based on the primary key column (e.g., primary keys 406 in FIG. 4) of a database table. Therefore, the data physically stored on disk in a database is sorted according to the primary key column. The actual data is stored in the leaf pages (aka, leaf nodes) 510-520. The nodes 504, 506, 508 between the root node 502 and leaf pages 510-520 are called intermediate levels. In the present example, only one intermediate level is shown for ease of illustration, but there may be multiple intermediate levels depending on the number of rows in the underlying database table.

The leaf pages 510-520 comprise data rows that contain the actual table data and are sorted according to the primary key of the table. The root node 502 and intermediate nodes, nodes 504, 506, 508, comprise index rows. Each index row contains a key value and a pointer to either an intermediate level node or a data row in a leaf page. The pointers help the database find data quickly. Without an index, a database server would have to read every record in the table to find requested data.

A database such as database 300 in FIG. 3 might also employ secondary indexes, which allow efficient access of records by means other than the primary key. Secondary indexes are indexes that process a segment type in a sequence other than the one defined by the segment's key.

Figure 6:
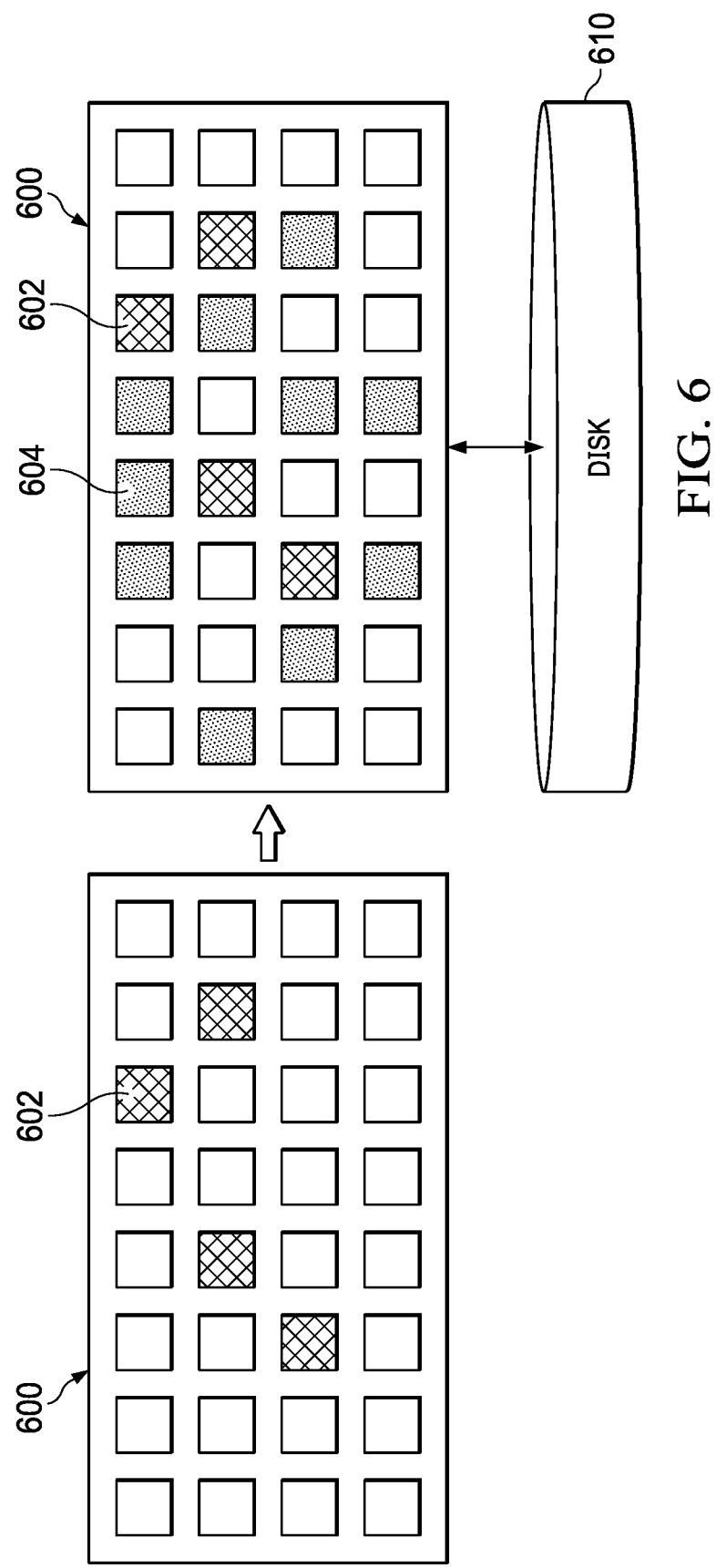
FIG. 6 depicts a diagram illustrating a database buffer pool with which the illustrative embodiments may be implemented.

FIG. 6 depicts a diagram illustrating a database buffer pool with which the illustrative embodiments may be implemented. Buffer pool 600 may be an example of buffer pool 306 in FIG. 3. When the database receives an operation statement, the referenced data might be scattered across a large number of pages in the database. Buffer pool 600 might not contain all the pages referenced in the statement. Referenced pages currently in buffer pool 600 are represented by hatched blocks 602.

In order to complete the operation on referenced pages not in the buffer pool 600, those pages must first be read from disk 610 into the buffer pool, represented by shaded blocks 604. However, if the operation references a large number of pages, attempting to read all the pages into the buffer pool 600 at once (synchronously) might place an excessive I/O burden on the database, thereby negatively impacting database performance.

Figure 7:
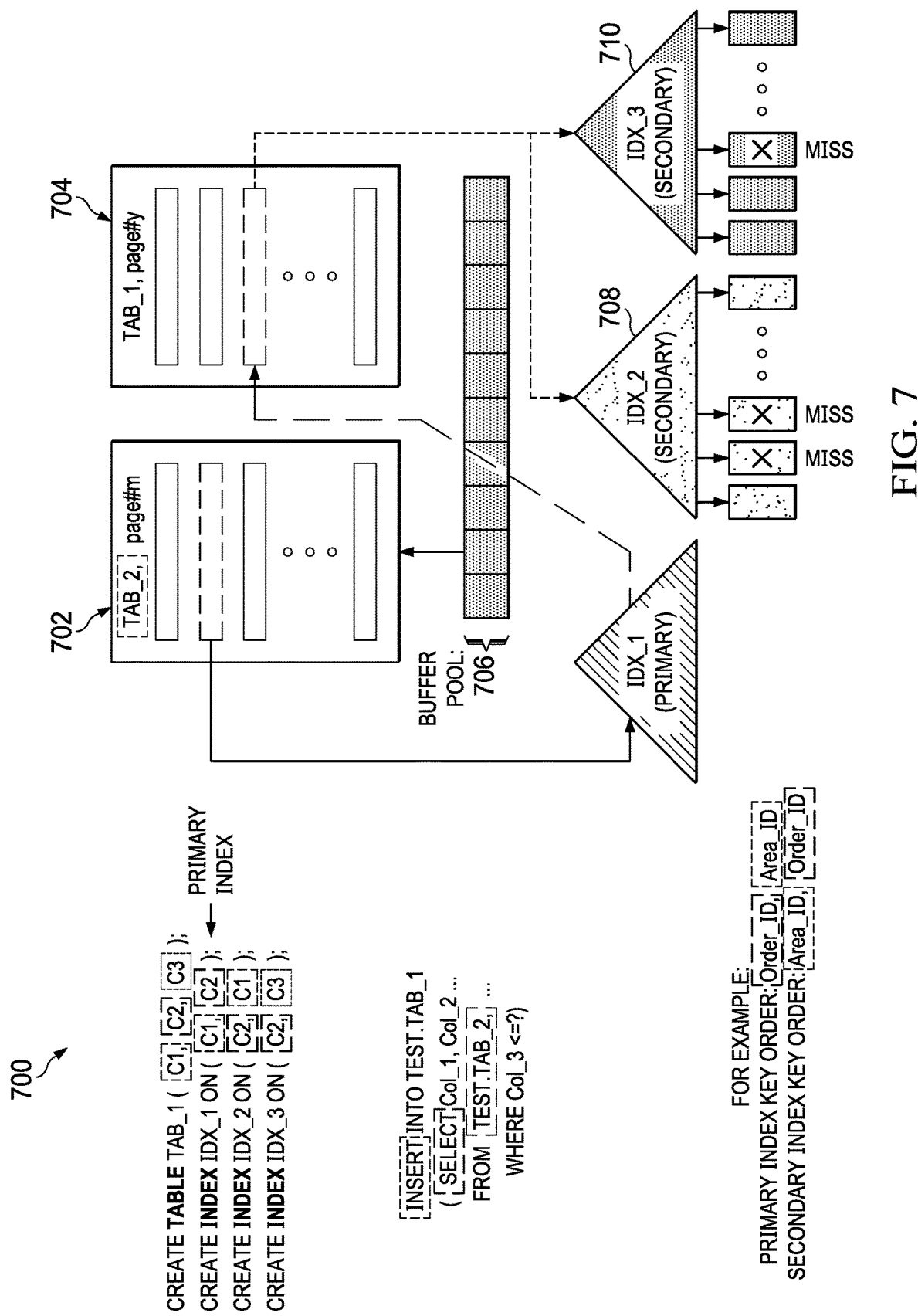
FIG. 7 depicts a diagram illustrating database batch Insert in accordance with an illustrative embodiment.

FIG. 7 depicts a diagram illustrating database batch Insert in accordance with an illustrative embodiment. Process 700 may be implemented in database 300 in FIG. 3. During a batch Insert, the database management system loads multiple rows of data into a database table at once rather than inserting them individually.

For a batch Insert, a pre-loading mechanism, such as page pre-loader 318 in FIG. 3, enables dynamically in response to the hit ratio against leaf pages decreasing below a specified threshold. In the present example, the database receives a batch Insert for insertion of columns from Table 2 702 into Table 1 704. However, enough leaf pages from secondary indexes 708 and 710 are missing from buffer pool 706 to trigger the pre-loading mechanism such as page pre-loader 318.

Figure 8:
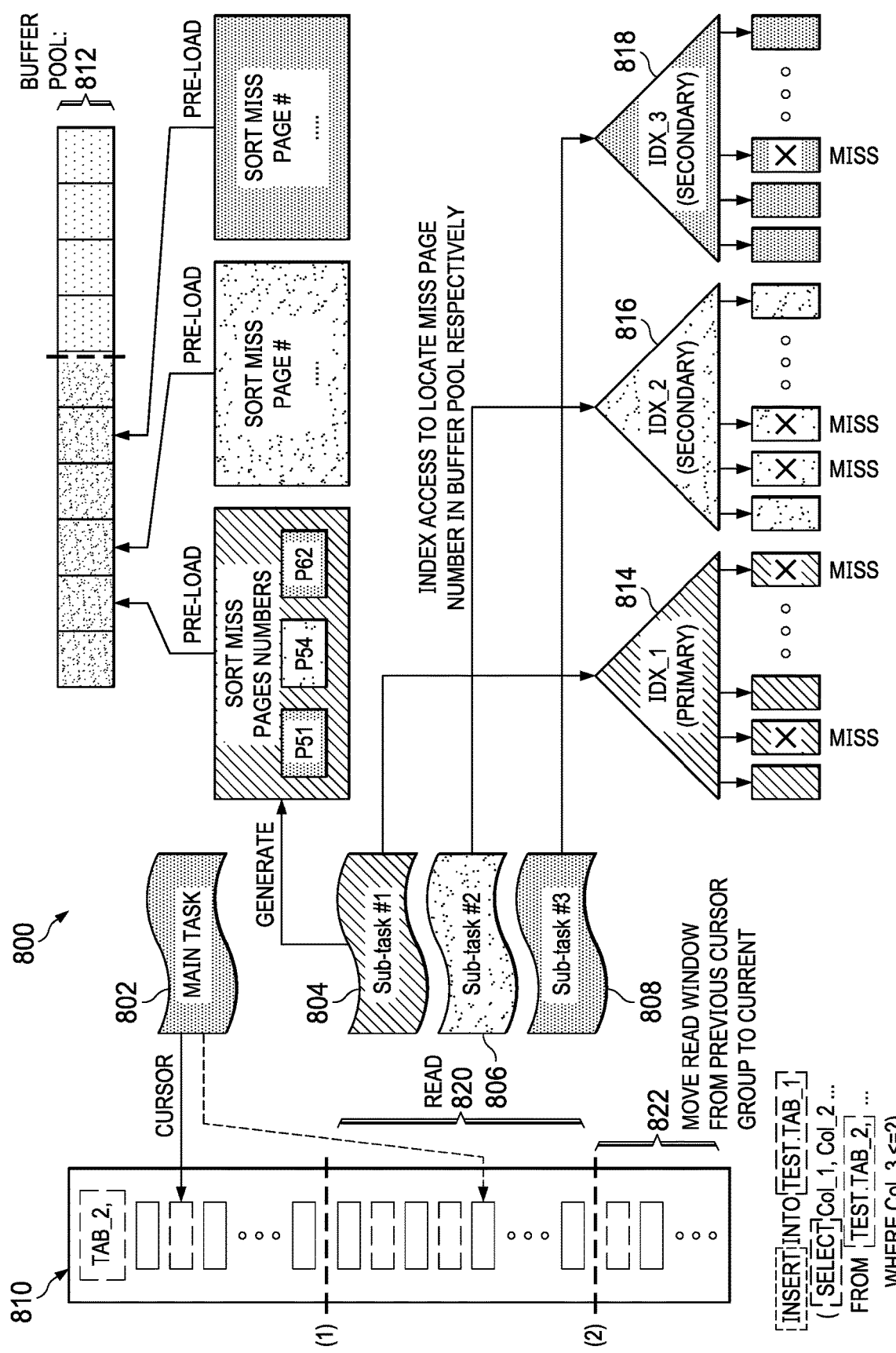
FIG. 8 depicts a diagram illustrating collecting and sorting of leaf pages for batch Insert in accordance with an illustrative embodiment.

FIG. 8 depicts a diagram illustrating collecting and sorting of leaf pages for batch Insert in accordance with an illustrative embodiment. Process 800 may be implemented in database 300 in FIG. 3.

For batch Insert, main task 802 is responsible for the database index Insert operation. Meanwhile, the pre-loading mechanism enables a number of sub-tasks 804, 806, 808 that detect whether modified leaf pages from table 810 are missed in the buffer pool 812. Sub-tasks 804, 806, 808 access indexes 814, 816, 818 to located leaf pages missed in the buffer pool 812.

Under the time window concept, sub-tasks 804, 806, 808 sort the missing page number and pre-load them into buffer pool 812 via asynchronous I/O for use by main task 802, thereby avoiding synchronous I/O page loading. The sub-tasks 804, 806, 808 stay a step ahead of main task 802. After batch 820 is pre-loaded into buffer pool 812, the sub-tasks 804, 806, 808 move on to load the next batch 822.

Figure 9:
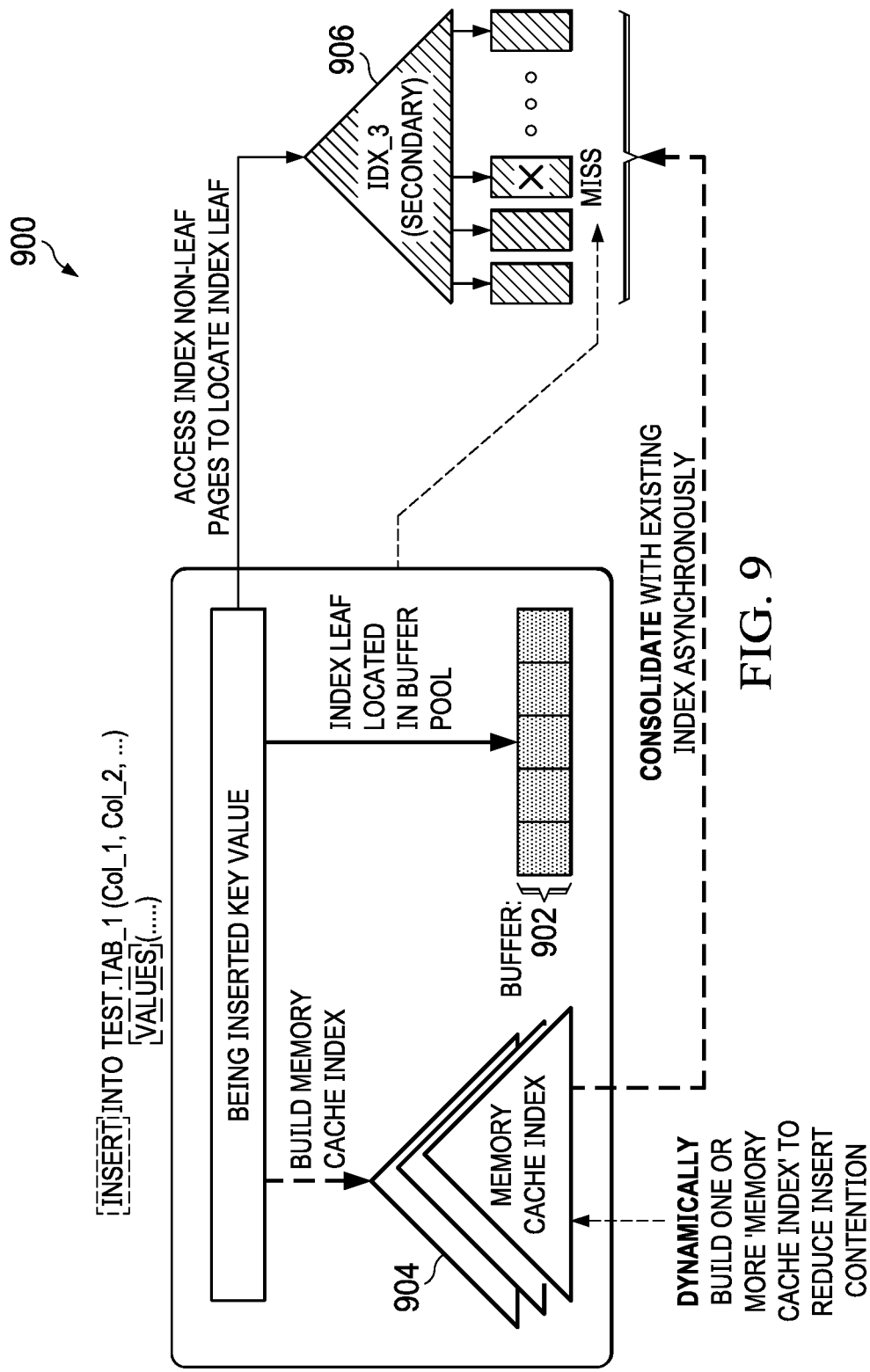
FIG. 9 depicts a diagram illustrating database random Insert in accordance with an illustrative embodiment.

FIG. 9 depicts a diagram illustrating database random Insert in accordance with an illustrative embodiment. Process 900 may be implemented in database 300 in FIG. 3. During a random Insert, the database management system loads data into random places into a database table rather than contiguous rows.

If leaf pages where new key values are to be inserted are missing from buffer pool 902, the database dynamically builds a number of memory cache indexes 904 to save the new key values being inserted, thereby reducing insert contention. The number of memory cache indexes built may be based on the size of the random insert. For example, if the number of inserts row exceeds a specified threshold, the inserts may be split into a number of memory cache indexes. The split into separate memory cache indexes may be based on key values according to, e.g., a hash function, key ranges, or a partition index key rule. Non-leaf pages are accessed in existing index 906 on disk to locate the missing leaf pages. The memory cache indexes 904 are then asynchronously merged with the existing index 906 to avoid synchronous I/O page loading.

Figure 10:
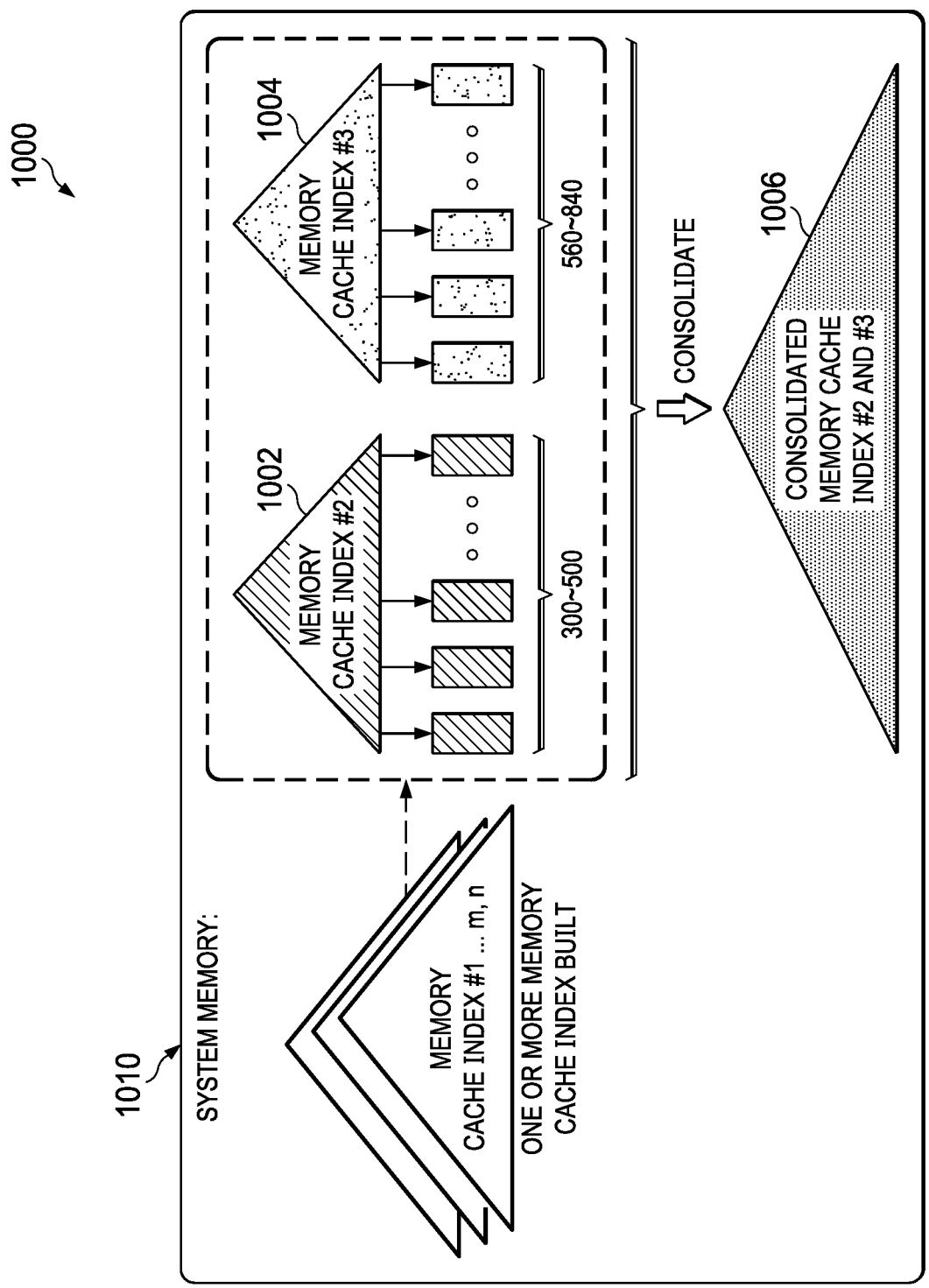
FIG. 10 depicts a diagram illustrating consolidating memory cache indexes in accordance with an illustrative embodiment.

FIG. 10 depicts a diagram illustrating consolidating memory cache indexes in accordance with an illustrative embodiment. Process 1000 may be implemented in database 300 in FIG. 3.

To reduce I/O overhead and improve query performance of the database, if multiple memory cache indexes were built for a random Insert, they are dynamically merged into a single consolidated memory cache index before consolidation with an existing index on disk. In the present example, memory cache index 1002 covering leaf pages 300-500 is dynamically merged with memory cache index 1004 covering leaf pages 560-840 to form consolidated memory cache index 1006. This merging of memory cache indexes 1002 and 1004 occurs within system memory 1010, which might be an example of memory 304 in FIG. 3. The use of a consolidated memory cache index 1006 for subsequent merging with the index on disk reduces synchronous I/O compared to merging the separate memory cache indexes 1002, 1004 individually with the existing index on disk.

Figure 11:
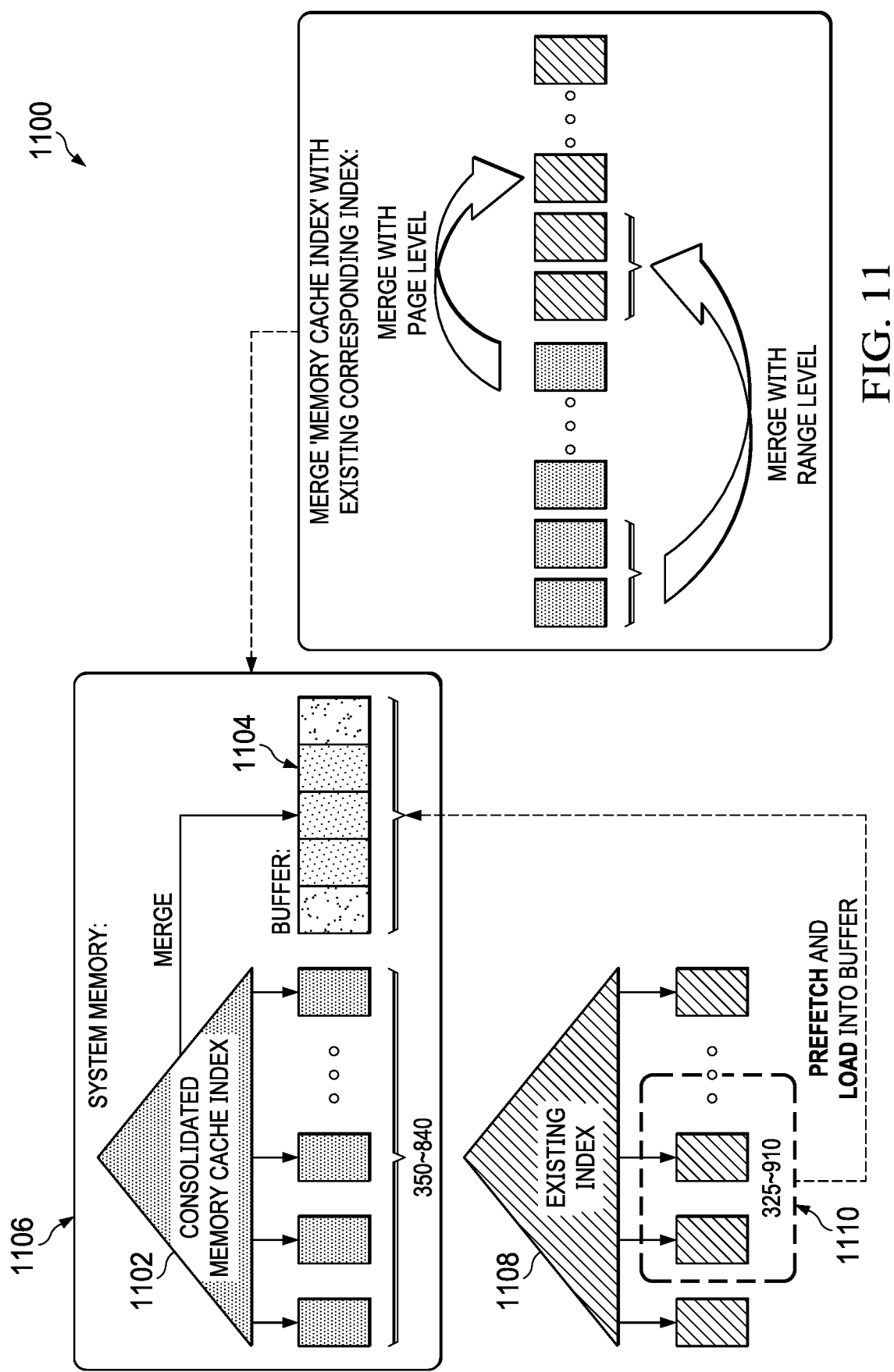
FIG. 11 depicts a diagram illustrating merging a memory cache index into an existing index in accordance with an illustrative embodiment.

FIG. 11 depicts a diagram illustrating merging a memory cache index into an existing index in accordance with an illustrative embodiment. Process 1100 may be implemented in database 300 in FIG. 3.

After consolidating separate memory cache indexes, the consolidated memory cache index 1102 is merged with the existing corresponding index 1108 on disk. Leaf pages 1110 from the existing index 1108 covering a range that includes the Insert operations are prefetched from disk and loaded into the buffer pool 1104 of system memory 1106. The consolidated memory cache index 1102 is then merged into the existing corresponding index 1108 on either a range level or a page level depending on the degree of overlap, if any, between the previously merged memory cached indexes.

Figure 12:
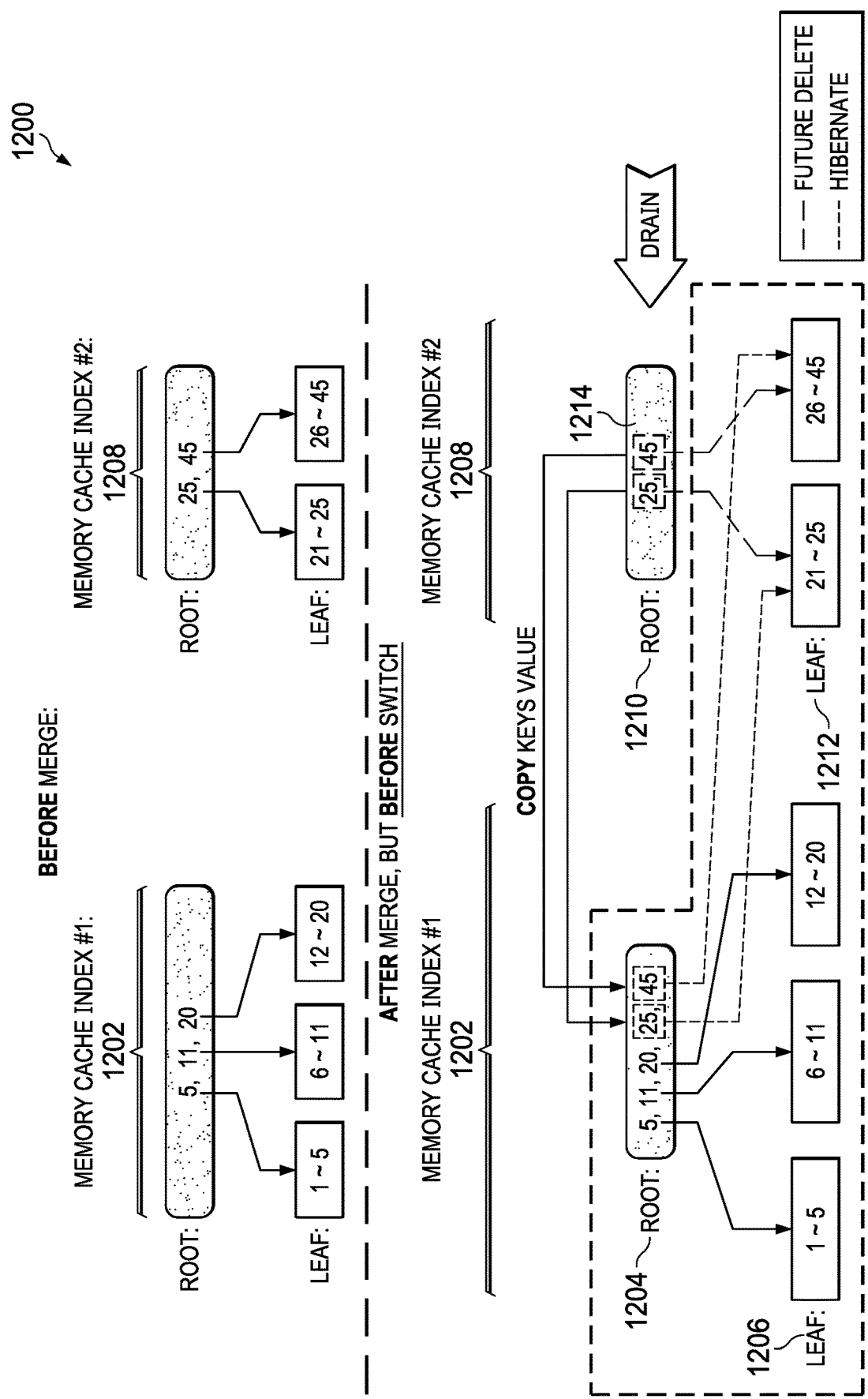
FIG. 12 depicts a diagram illustrating index consolidation range by range in the case of no overlap between indexes in accordance with an illustrative embodiment.

FIG. 12 depicts a diagram illustrating index consolidation range by range in the case of no overlap between indexes in accordance with an illustrative embodiment. Process 1200 may be implemented in database 300 in FIG. 3.

In the present example, there is no overlap between the respective leaf pages 1206, 1212 of the two memory cache indexes 1202, 1208. Merging the memory caches indexes 1202, 1208 into a consolidated memory cache index takes up less room in the buffer pool. In practice, either memory cache index can be merged into the other. A default rule may (but does not have to) specify that a smaller memory cache index is merged into a larger one. Other merge rules may be employed by the illustrative embodiments.

In the present example, the memory cache indexes 1202, 1208 are merged by copying key values 1214 from the root node 1210 of the second memory cache index 1208 to the root node 1204 of the first memory cache index 1202. After the key values 1214 are copied from root node 1210 to root node 1204, the leaf pages 1212 from second memory cache index 1208 are linked to root node 1204. Key values 1214 are then removed (drained) from root index 1210 before the switch wherein the consolidated memory cache index is merged with the existing local index on disk.

Figure 13:
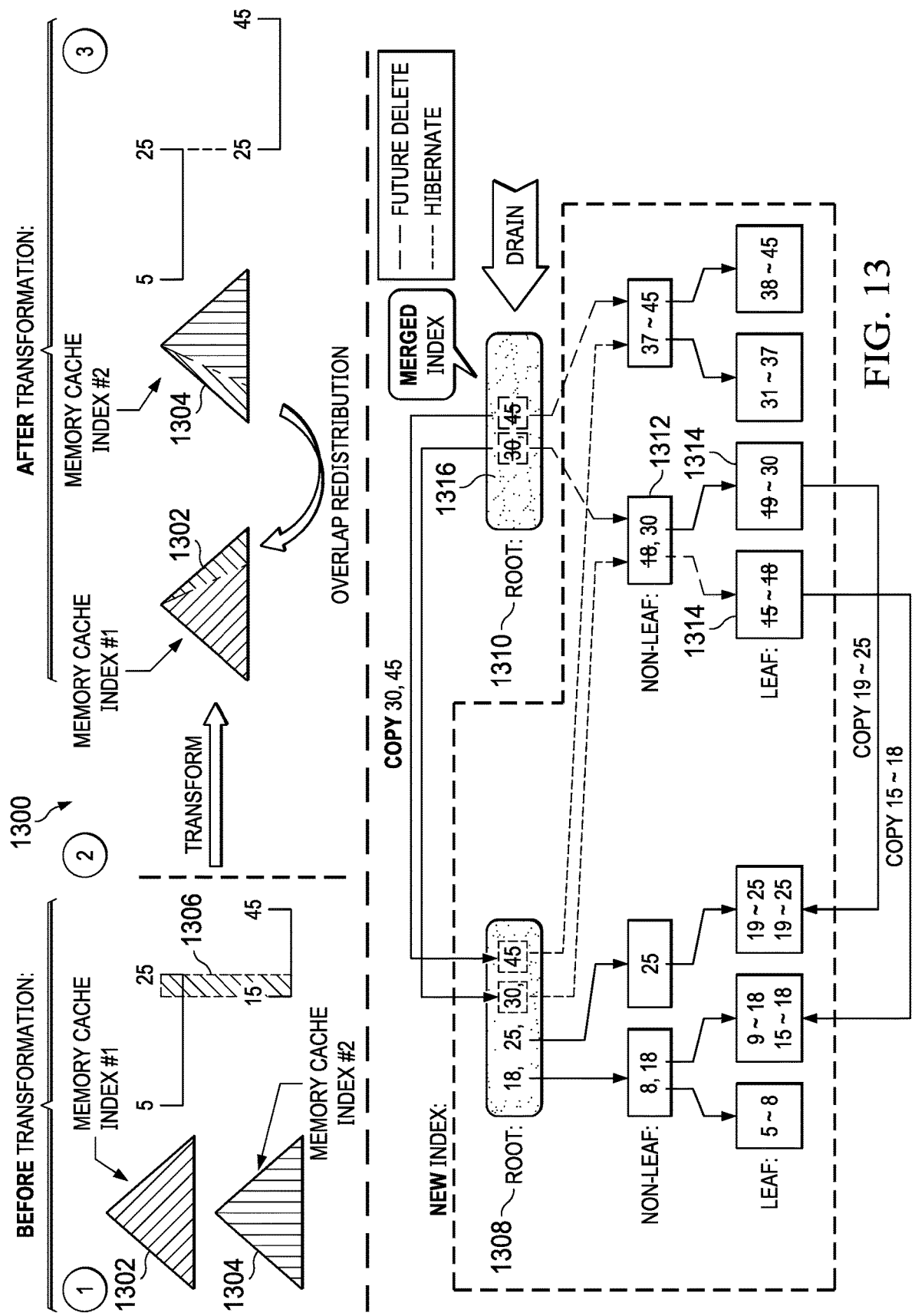
FIG. 13 depicts a diagram illustrating index consolidation range by range in the case of a small overlap between indexes in accordance with an illustrative embodiment.

FIG. 13 depicts a diagram illustrating index consolidation range by range in the case of a small overlap between indexes in accordance with an illustrative embodiment. Process 1300 may be implemented in database 300 in FIG. 3.

In a case where there is a small overlap 1306 of leaf pages between the memory cache indexes 1302, 1304 below a specified threshold, the overlapping leaf pages are first redistributed from one index to the other before consolidating the root nodes. Similar to process 1200 in FIG. 12, the overlapping leaf pages may be redistributed to either memory cache index. Again, a simple default rule may specify that the overlapping pages be redistributed to the larger memory cache index. In the present example, the leaf pages 1314 through 25 in the second memory cache index 1304 are redistributed to the first memory cache index 1302 and then removed from the second memory cache index 1304, which is also accounted for in the index rows of the intermediate level non-leaf pages 1312.

After redistributing the overlapping pages, the key values 1316 of the root node 1310 of the second memory cache index 1304 are then copied to the root node 1308 of the first memory cache index 1302 and the intermediate non-leaf pages 1312 are linked to root node 1308, similar to process 1200 in FIG. 12. The key values 1316 are then removed from root node 1310 before the consolidated memory cache index is merged with the existing local index on disk.

Figure 14:
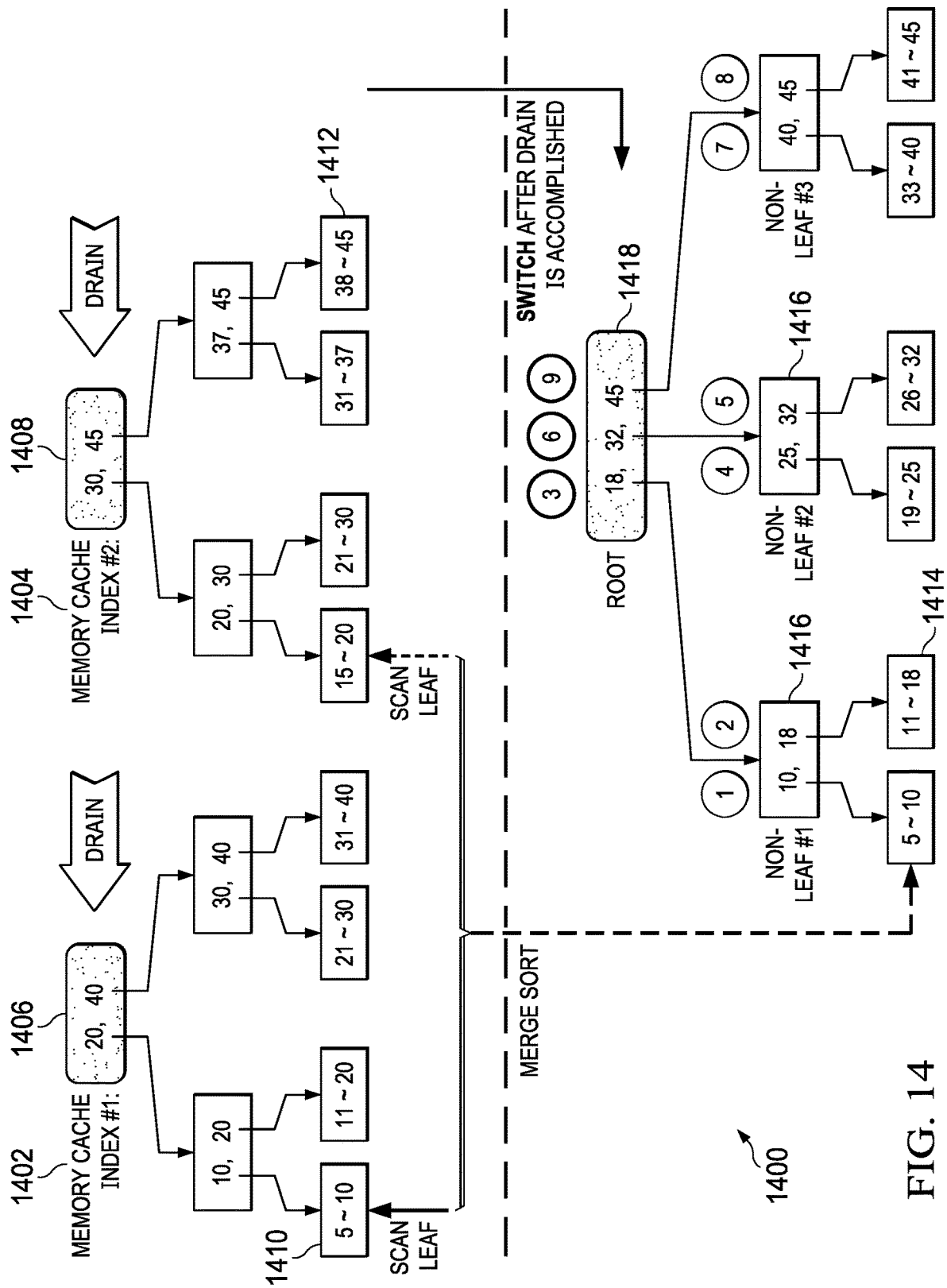
FIG. 14 depicts a diagram illustrating index consolidation page-by-page in the case of a large overlap between indexes in accordance with an illustrative embodiment.

FIG. 14 depicts a diagram illustrating index consolidation page-by-page in the case of a large overlap between indexes in accordance with an illustrative embodiment. Process 1400 may be implemented in database 300 in FIG. 3.

In the case where there is a large overlap of leaf pages between the memory cache indexes above a specified threshold, the memory cache indexes are consolidated page-by-page. In the present example, the majority of the leaf pages 1410 in the first memory cache index 1402 overlap with the majority of leaf pages 1412 in the second memory cache index 1404. With such a large overlap, trying to simply redistribute the overlap from one memory cache index to another (as in process 1300 in FIG. 13) would be inefficient. Therefore, process 1400 occurs at a lower level of granularity by merging at the page level.

Process 1400 first scans key values in the respective root nodes 1406, 1408 of the first and second memory caches indexes 1402, 1404 and merges them into a new root node 1418. The respective leaf pages 1410, 1412 of each memory cache index are then scanned page-by-page according to the scanned page numbers referenced in the root nodes 1406, 1408. The scanned leaf pages are then sorted into merged leaf pages 1414 thereby eliminating redundant page numbers between leaf pages 1410 and 1412. Corresponding intermediate nodes 1416 may be created as necessary between the new root node 1418 and merged leaf pages 1414. Process 1400 scans the next key values in root nodes 1406, 1408 and continues mering the root nodes into new root node 1418 and scanning leaf pages 1410, 1412 page-by-page to merge them. After root nodes 1406, 1408 have been completely merged into new root node 1418 and leaf pages 1410, 1412 have been sorted into merged leaf pages 1414, root nodes 1406 and 1408 are both drained before the switch to merge the consolidated memory cache index with the existing local index on disk.

In the case of Delete operations, a method similar to that for random Inserts as shown in FIGS. 9-14 can be used but with a Delete index entry placed in the memory cache index instead of an Insert value.

An Update operation would comprise performing an index Delete operation as described above followed by an index random Insert operation.

For a Select statement, the database may use the memory cache index to search first. If the key being search is marked as delete in the memory cache index, nothing is returned, and the index search is stopped. Otherwise, the key value found first is returned, and the Record ID of the key is remembered. The corresponding existing index on disk is then searched. The Record ID from the memory cached index is used for comparison when a key is found in the existing index on disk to avoid duplicate search results.

Figure 15:
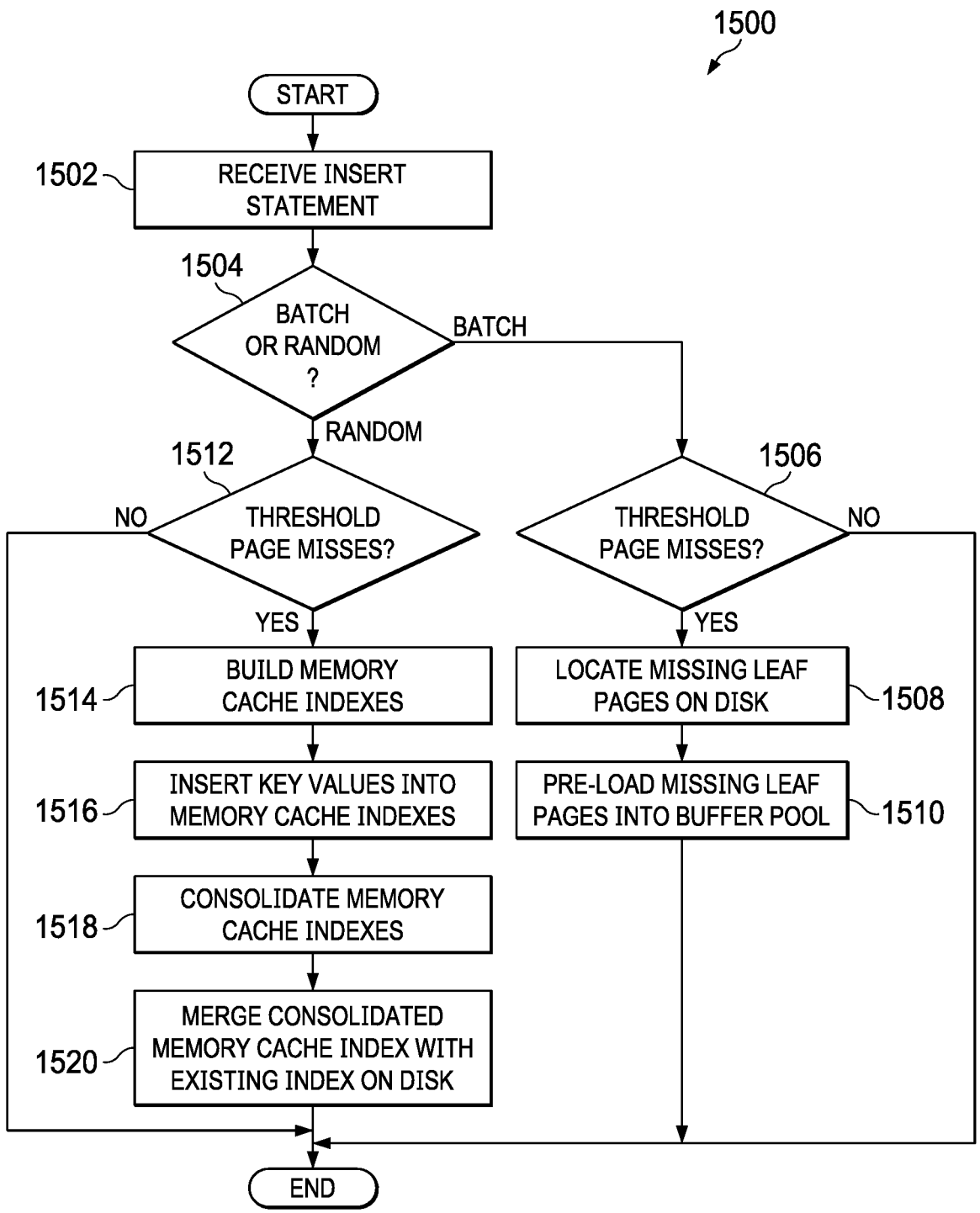
FIG. 15 depicts a flowchart illustrating a process for managing database operations in accordance with an illustrative embodiment.

FIG. 15 depicts a flowchart illustrating a process for managing database operations in accordance with an illustrative embodiment. Process 1500 may be implemented in database 300 shown in FIG. 3 using a data processing system such as data processing system 200 in FIG. 2.

Process 1500 begins by the database receiving an insert statement for a database (step 1502). Process 1500 determines if the insert statement is for a batch insert operation or random insert operation (step 1504). For a batch insert operation, responsive to determining a threshold number of leaf pages specified in the insert statement are missing from a memory buffer pool of the database (step 1506), process 1500 locates the missing leaf pages on disk (step 1508) and asynchronously pre-loads the missing leaf pages from a corresponding index on disk in the database into the memory buffer pool (step 1510). A number of sub-tasks accesses a number of indexes on disk in the database to locate the missing leaf pages and sort them for pre-loading into the memory buffer pool.

For a random insert operation, responsive to determining a threshold number of leaf pages specified in the insert statement are missing from a memory buffer pool of the database (step 1512), process 1500 builds at least one memory cache index (step 1514) and inserts the key values specified in the insert statement in the memory cache index (step 1516). If multiple memory cache indexes are built, they are consolidated into a single consolidated memory cache index (step 1518). The memory cache index (or consolidated memory cache index) is then merged with a corresponding index on disk in the database (step 1520).

Process 1500 then ends.

Figure 16:
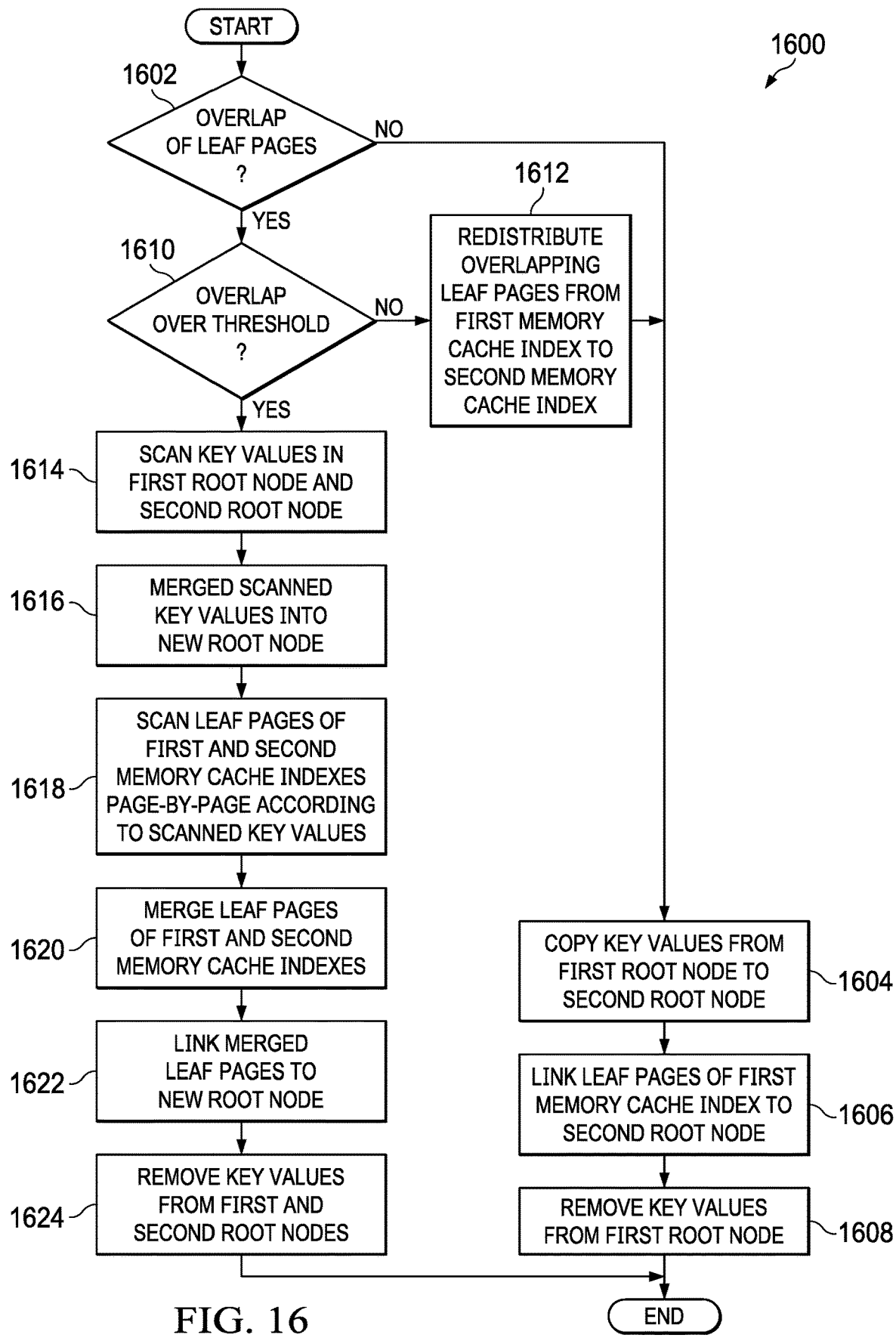
FIG. 16 depicts a flowchart illustrating a process for merging memory cache indexes in accordance with an illustrating embodiment.

FIG. 16 depicts a flowchart illustrating a process for merging memory cache indexes in accordance with an illustrating embodiment. Process 1600 may be a more detailed example of step 1518 in FIG. 15.

Process 1600 begins by determining if there is any overlap of leaf pages referenced by the different memory cache indexes (step 1602). If there is no overlap of leaf pages, the key values of the first root node are copied to the second root node (step 1604). The leaf pages of the first memory cache index are then linked to the second root node (step 1606). The key values are removed (drained) from the first node before the consolidated memory cache index is merged with the existing local index on disk (step 1608).

If there is an overlap of referenced leaf pages between the memory cache indexes, process 1600 determines if the size of the overlap is over a specified threshold (step 1610). If the overlap size is below the threshold, the overlapping pages are redistributed from the first memory cache index to the second memory cache index (step 1612). Process 1600 then proceeds to step 1604.

If the overlap is above the threshold, the memory cache indexes are merged page-by-page. Key values are scanned in the first root node and second root node (step 1614) and merged into a new third root node (step 1616). The leaf pages in the first and second memory cache indexes are then scanned page-by-page according to the scanned key values from the root nodes (step 1618).

The scanned leaf pages of the first and second memory index caches are merged together, eliminating redundancies between them (step 1620). The merged leaf pages are linked to the new third root node (step 1622). The key values are then removed from both the first and second root nodes node before the new consolidated memory cache index is merged with the existing local index on disk (step 1624).

Process 1600 then ends.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing database operations, the method comprising:
　using a number of processors to perform the steps of:
　　receiving an insert statement for a database;
　　determining the insert statement is for a batch insert operation or random insert operation;
　　for a batch insert operation, responsive to determining a threshold number of leaf pages specified in the insert statement are missing from a memory buffer pool of the database, asynchronously pre-loading missing leaf pages from a corresponding index on disk in the database into the memory buffer pool;

for a random insert operation, responsive to determining a threshold number of leaf pages specified in the insert statement are missing from a memory buffer pool of the database:
    building at least one memory cache index;
    inserting key values specified in the insert statement in the memory cache index; and
    merging the memory cache index with a corresponding index on disk in the database.

2. The method of claim 1, wherein, for a batch insert, a number of sub-tasks access a number of indexes on disk in the database and locate the missing leaf pages for pre-loading into the memory buffer pool.

3. The method of claim 2, wherein the sub-tasks sort the missing leaf pages for pre-loading into the memory buffer pool.

4. The method of claim 1, wherein building at least one memory cache index comprises building multiple memory cache indexes.

5. The method of claim 4, further comprising consolidating the multiple memory cache indexes into a single consolidated memory cache index prior to merging with the corresponding index on disk.

6. The method of claim 5, wherein consolidating the multiple memory cache indexes comprises merging leaf pages by range when overlap between leaf pages in the indexes is below a specified threshold range.

7. The method of claim 5, wherein consolidating the multiple memory cache indexes comprises merging leaf pages individually when overlap between leaf pages in the indexes is above a specified threshold range.

8. A system for managing database operations, the system comprising:
    a storage device configured to store program instructions; and
    one or more processors operably connected to the storage device and configured to execute the program instructions to cause the system to:
        receive an insert statement for a database;
        determine the insert statement is for a batch insert operation or random insert operation;
        for a batch insert operation, responsive to determining a threshold number of leaf pages specified in the insert statement are missing from a memory buffer pool of the database, asynchronously pre-load missing leaf pages from a corresponding index on disk in the database into the memory buffer pool;
        for a random insert operation, responsive to determining a threshold number of leaf pages specified in the insert statement are missing from a memory buffer pool of the database:
            build at least one memory cache index;
            insert key values specified in the insert statement in the memory cache index; and
            merge the memory cache index with a corresponding index on disk in the database.

9. The system of claim 8, wherein, for a batch insert, a number of sub-tasks access a number of indexes on disk in the database and locate the missing leaf pages for pre-loading into the memory buffer pool.

10. The system of claim 9, wherein the sub-tasks sort the missing leaf pages for pre-loading into the memory buffer pool.

11. The system of claim 8, wherein building at least one memory cache index comprises building multiple memory cache indexes.

12. The system of claim 8, further comprising consolidating the multiple memory cache indexes into a single consolidated memory cache index prior to merging with the corresponding index on disk.

13. The system of claim 12, wherein consolidating the multiple memory cache indexes comprises merging leaf pages by range when overlap between leaf pages in the indexes is below a specified threshold range.

14. The system of claim 12, wherein consolidating the multiple memory cache indexes comprises merging leaf pages individually when overlap between leaf pages in the indexes is above a specified threshold range.

15. A computer program product for managing database operations, the computer program product comprising:
    a computer-readable storage medium having program instructions embodied thereon to perform the steps of:
        receiving an insert statement for a database;
        determining the insert statement is for a batch insert operation or random insert operation;
        for a batch insert operation, responsive to determining a threshold number of leaf pages specified in the insert statement are missing from a memory buffer pool of the database, asynchronously pre-loading missing leaf pages from a corresponding index on disk in the database into the memory buffer pool;
        for a random insert operation, responsive to determining a threshold number of leaf pages specified in the insert statement are missing from a memory buffer pool of the database:
            building at least one memory cache index;
            inserting key values specified in the insert statement in the memory cache index; and
            merging the memory cache index with a corresponding index on disk in the database.

16. The computer program product of claim 15, wherein, for a batch insert, a number of sub-tasks access a number of indexes on disk in the database and locate the missing leaf pages for pre-loading into the memory buffer pool.

17. The computer program product of claim 16, wherein the sub-tasks sort the missing leaf pages for pre-loading into the memory buffer pool.

18. The computer program product of claim 15, wherein the at least one memory cache index comprises multiple memory cache indexes, and further comprising consolidating the multiple memory cache indexes into a single consolidated memory cache index prior to merging with the corresponding index on disk.

19. The computer program product of claim 18, wherein consolidating the multiple memory cache indexes comprises merging leaf pages by range when overlap between leaf pages in the indexes is below a specified threshold range.

20. The computer program product of claim 18, wherein consolidating the multiple memory cache indexes comprises merging leaf pages individually when overlap between leaf pages in the indexes is above a specified threshold range.

\* \* \* \* \*